(12) United States Patent
Wang et al.

(10) Patent No.: US 10,094,666 B1
(45) Date of Patent: Oct. 9, 2018

(54) METHOD OF ROOM BASED POSITION DETERMINATION

(71) Applicant: Quantek, Inc., Hsinchu (TW)

(72) Inventors: Sheng Wang, Taipei (TW); Yu-Liang Chen, Chiayi (TW)

(73) Assignee: Quantek, Inc., Hsinchu (TW)

( * ) Notice: Subject to any disclaimer, the term of this patent is extended or adjusted under 35 U.S.C. 154(b) by 0 days.

(21) Appl. No.: 15/615,804

(22) Filed: Jun. 6, 2017

Related U.S. Application Data (60) Provisional application No. 62/472,531, filed on Mar. 16, 2017.

(51) Int. Cl.
| | |
|---|---|
| *H04W 24/00* | (2009.01) |
| *G01C 21/00* | (2006.01) |
| *G01C 21/20* | (2006.01) |
| *G01S 5/02* | (2010.01) |
| *H04W 4/021* | (2018.01) |
| *H04W 4/04* | (2009.01) |

(52) U.S. Cl.
CPC ......... *G01C 21/005* (2013.01); *G01C 21/206* (2013.01); *G01S 5/0252* (2013.01); *H04W 4/021* (2013.01); *H04W 4/043* (2013.01)

(58) Field of Classification Search
CPC ... G01C 21/005; G01C 21/206; G01S 5/0252; H04W 4/043; H04W 4/021
USPC ............................. 455/456.1–456.3; 370/338
See application file for complete search history.

(56) References Cited

U.S. PATENT DOCUMENTS

| | | | |
|---|---|---|---|
| 2014/0073345 A1* | 3/2014 | Chintalapudi | G01C 21/165 455/456.1 |
| 2015/0237480 A1* | 8/2015 | Fang | H04W 4/04 455/456.6 |

\* cited by examiner

*Primary Examiner* — Marcos Batista
(74) *Attorney, Agent, or Firm* — Winston Hsu (57) ABSTRACT

A method of room based position determination for a mobile node in a positioning system is disclosed. The method comprises determining a room in an area deployed with at least a reference node of the positioning system, collecting a plurality of RSSI data from the at least a reference node in every place of the room, establishing a room fingerprint, performing a real-time RSSI measurement on the at least a reference node, to collect a plurality of real-time RSSI data from the at least a reference node, and determining whether the mobile node is within the room according to the RSSI mean parameter, the maximum distance parameter of the room fingerprint database and the collected real-time RSSI data from the at least a reference node.

19 Claims, 9 Drawing Sheets

| ROOM | Determination | Calculation |
|---|---|---|
| | 1 | 1 |
| | 1 | 2 |
| | 1 | 1 |
| | 1 | 3 |
| | 1 | 3 |
| | 1 | 3 |
| | 1 | 3 |
| | 3 | 3 |
| | 3 | 3 |
| | 3 | 1 |
| | 3 | 3 |
| | 3 | 3 |

METHOD OF ROOM BASED POSITION DETERMINATION

CROSS REFERENCE TO RELATED APPLICATIONS

This application claims the benefit of U.S. Provisional Application No. 62/472,531, filed on Mar. 16, 2017 and entitled "Room-Base Position Determination without knowing the Map and the RF node position", the contents of which are incorporated herein in their entirety.

BACKGROUND OF THE INVENTION

1. Field of the Invention

The present disclosure relates to a method used in a positioning system, and more particularly, to a method of room based position determination in a positioning system for improving positioning accuracy.

2. Description of the Prior Art

Positioning system is used for detecting a current location of a target/object, and is based on wireless technologies, such as Wi-Fi, Bluetooth, RFID, and GPS, which is consisted of a set of reference nodes (e.g. access points) for radiating signals recorded by a mobile node (e.g. RFID tag and mobile phone), or recording signals radiated from the mobile node. For positioning the mobile node, the mobile node may broadcast a RF signal to reference nods nearby and therefore the reference nodes reply by sending their coordinates and received signal strength indicator (RSSI) data. Thus, the mobile node can estimate the distance between the reference nodes according to the RSSI data, and then calculates the position of the mobile node by the coordinates of the reference nodes and the estimated distance. Note that, abovementioned mobile node may be a RF device attached to objects or worn by people.

With conventional positioning method, before positioning the mobile node, a RSSI database or called RSSI fingerprint of the positioning system deployed with a plurality of reference nodes should be established in the mobile node. The RSSI fingerprint includes coordinates of the reference nodes and RSSI data collected from the reference nodes. In a word, the mobile node knows the locations of the reference nodes. Thus, upon real-time position determination, the mobile node can obtain a distance to the reference node according to the real-time measured RSSI data in compared with the RSSI data of the RSSI fingerprint, and compute the position of the mobile node with the coordinates of the RSSI fingerprint and the distance.

However, the conventional positioning method requires knowing deployment information (i.e. reference node map) to compute the position of the target/object. In addition, real-time position determination is merely based on the estimated distance, which causes positioning inaccuracy.

SUMMARY OF THE INVENTION

It is therefore an objective to provide a method of room based position determination to solve the above problems.

The present disclosure provides a method of room based position determination for a mobile node in a positioning system. The method comprises determining a room in an area deployed with at least a reference node of the positioning system, collecting a plurality of received signal strength indicator (RSSI) data from the at least a reference node in every place of the room, establishing a room fingerprint database, which includes a RSSI mean parameter indicating a RSSI value at the center of the room and a maximum distance parameter indicating a radius of the room, wherein the RSSI value and the radius are calculated according to the collected RSSI data from the at least a reference node, performing a real-time RSSI measurement on the at least a reference node, to collect a plurality of real-time RSSI data from the at least a reference node, and determining whether the mobile node is within the room according to the RSSI mean parameter, the maximum distance parameter of the room fingerprint database and the collected real-time RSSI data from the at least a reference node.

The present disclosure provides a method of room based position determination for a first reference node in a positioning system. The method comprises determining a room in an area deployed with a mobile node of the positioning system, collecting a plurality of received signal strength indicator (RSSI) data from the mobile node moving within the room, establishing a room fingerprint database, which includes a RSSI mean parameter indicating a RSSI value at the center of the room and a maximum distance parameter indicating a radius of the room, wherein the RSSI value and the radius are calculated according to the collected RSSI data from the mobile node, performing a real-time RSSI measurement on the mobile node, to collect a plurality of real-time RSSI data from the mobile node, and determining whether the mobile node is within the room according to the RSSI mean parameter, the maximum distance parameter of the room fingerprint database and the collected real-time RSSI data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
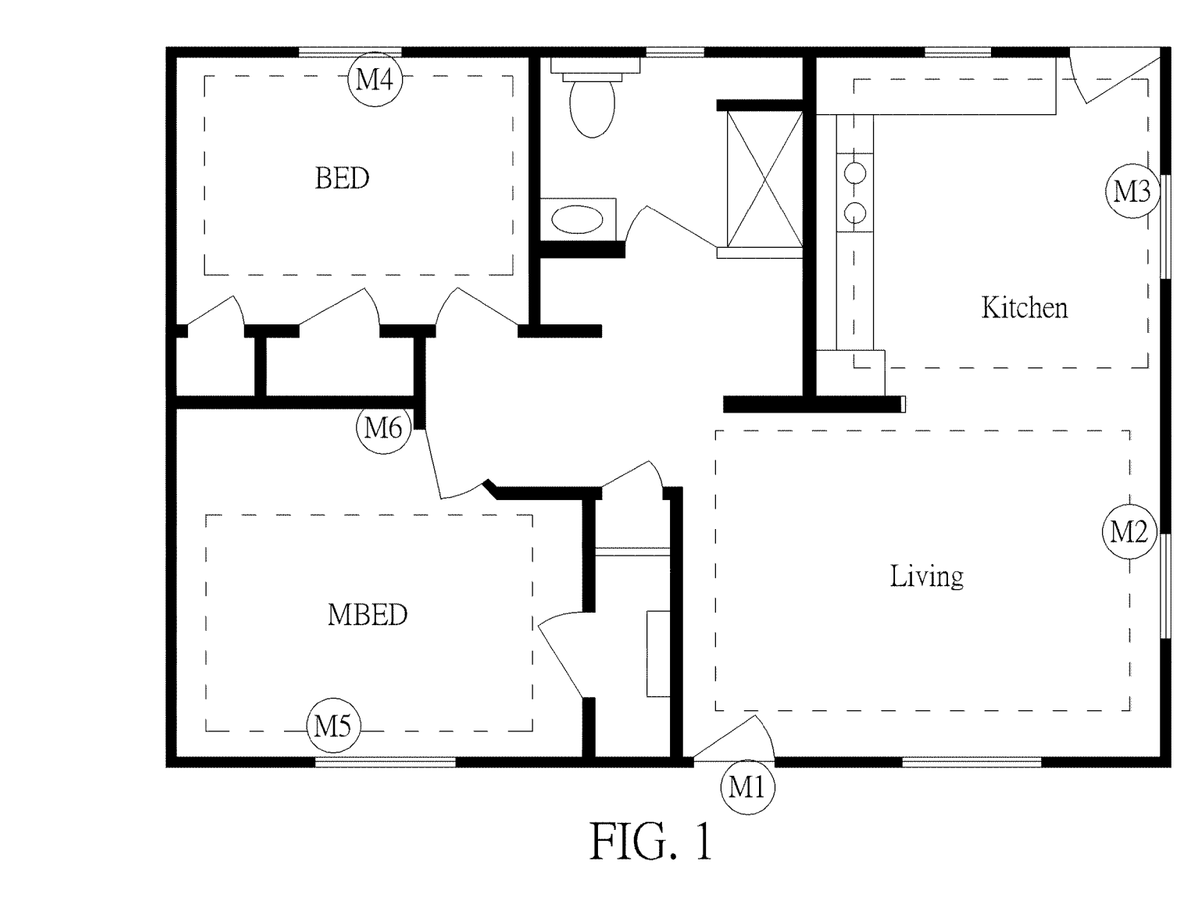
FIG. 1 is a schematic diagram of a positioning system architecture according to one embodiment of the present disclosure.

FIG. 1 is a schematic diagram of a positioning system architecture according to one embodiment of the present disclosure. The positioning system is applied in an area (home, house or parking lot) deployed with a plurality of reference nodes M1-M6. The reference nodes M1-M6 may be radio frequency (RF) products, which are installed in the area without deployment information (i.e. reference node map). Thus, when a mobile node enters this area, the mobile node does not have the map information of the area. In FIG. 1, multiple rooms such as "BED", "Kitchen", "MBED" and "Living" are defined in the area. In this article, a room means a space without huge object inside to block and attenuate the RF single, which may be with or without the barrier at the outline of the room.

Figure 2:
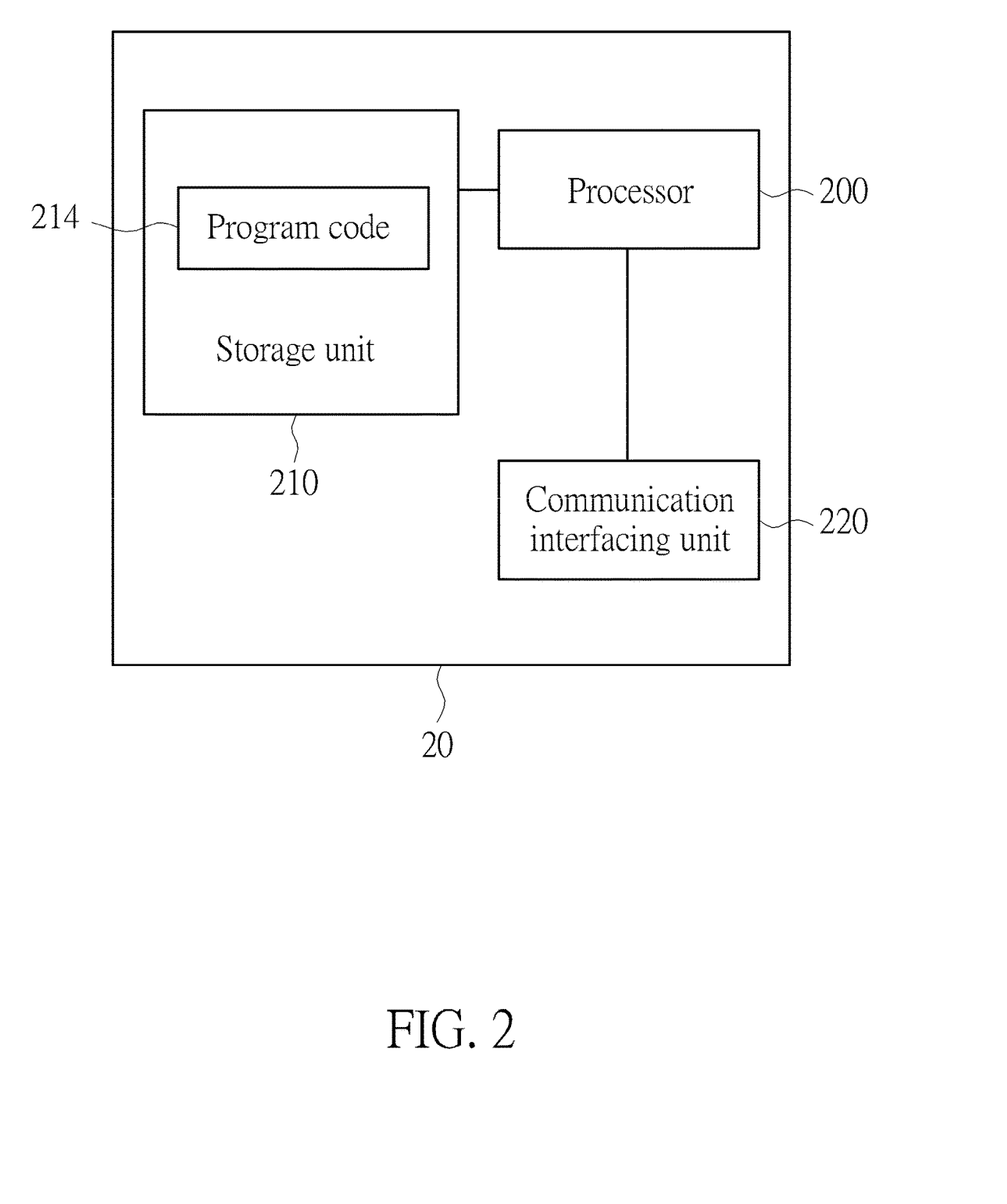
FIG. 2 is a schematic diagram of a communication device according to one embodiment of the present disclosure.

FIG. 2 is a schematic diagram of a communication device 20 according to one embodiment of the present disclosure. The communication device 20 can be any wireless node such as a reference node of FIG. 1 or a mobile node (e.g. RFID tag mobile phone, or any RF device), and includes a processor 200, such as a microprocessor or Application Specific Integrated Circuit (ASIC), a storage unit 210 and a communication interfacing unit 220. The storage unit 210 may be any data storage device that can store a program code 214, for access by the processor 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with another wireless node according to processing results of the processor 200.

Figure 3:
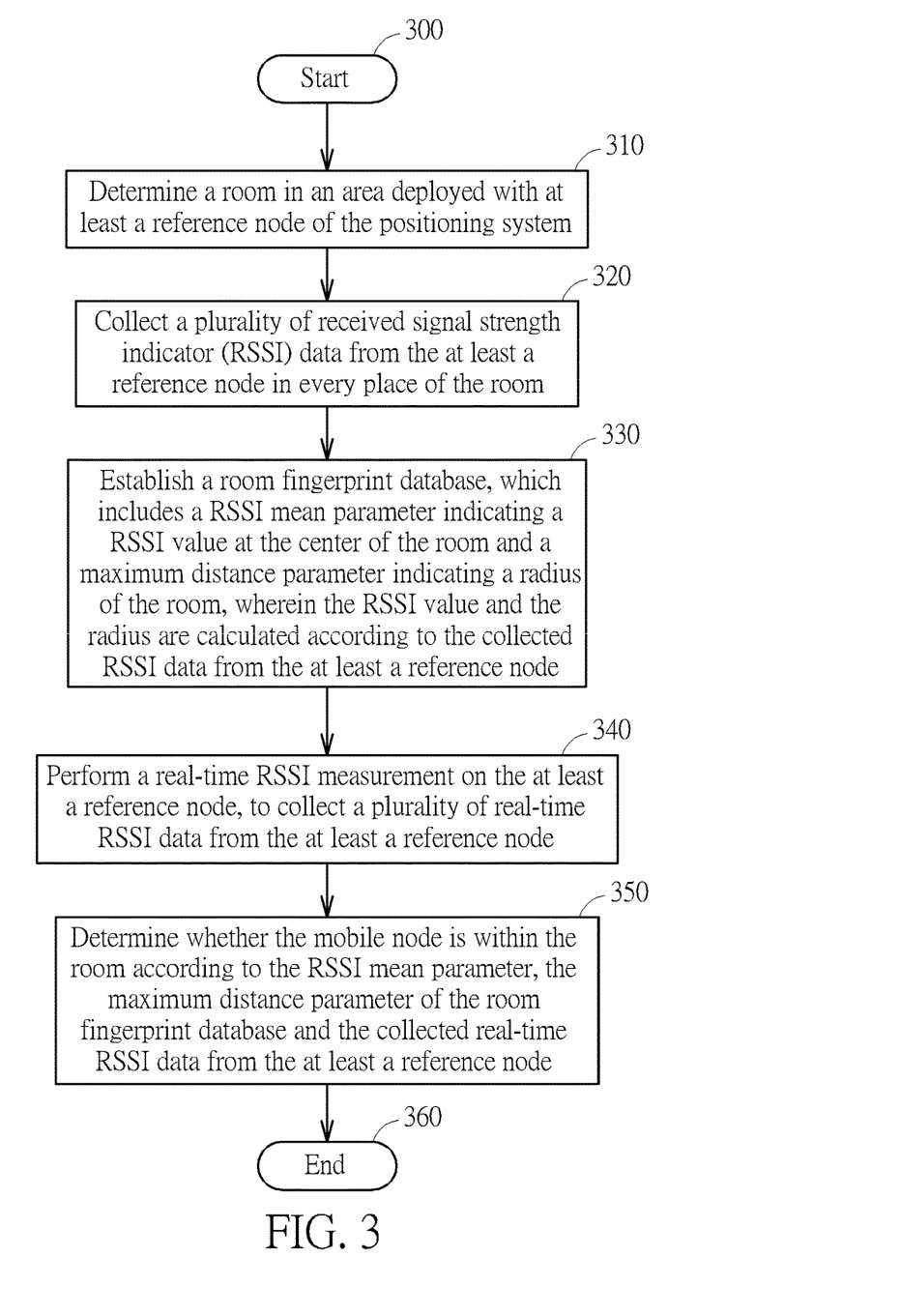
FIG. 3 is a flowchart of a process according to one embodiment of the present disclosure.

Reference is made to FIG. 3. A flowchart of a process 30 according to an embodiment of the present disclosure is illustrated. The process 30 could be utilized in the communication device 20 of FIG. 2 for room based position determination in the positioning system, so as to increase positioning accuracy. The process 30 may be compiled into a program code 214 to be stored in the storage unit 210, and may include the following steps:

Step 300: Start.
Step 310: Determine a room in an area deployed with at least a reference node of the positioning system.
Step 320: Collect a plurality of received signal strength indicator (RSSI) data from the at least a reference node in every place of the room.
Step 330: Establish a room fingerprint database, which includes a RSSI mean parameter indicating a RSSI value at the center of the room and a maximum distance parameter indicating a radius of the room, wherein the RSSI value and the radius are calculated according to the collected RSSI data from the at least a reference node.
Step 340: Perform a real-time RSSI measurement on the at least a reference node, to collect a plurality of real-time RSSI data from the at least a reference node.
Step 350: Determine whether the mobile node is within the room according to the RSSI mean parameter, the maximum distance parameter of the room fingerprint database and the collected real-time RSSI data from the at least a reference node.
Step 360: End.

Based on the process 30, the mobile node establishes a room fingerprint for defining a room with RSSI data received from the reference nodes of the positioning system, and then uses the room as the first base to determine the position of itself. In other words, the mobile device first determines which room the mobile node is at, and then determines a precise position within the room, which increases positioning accuracy. In addition, with room fingerprint establishment, the mobile node of the present invention is able to perform position determination without deployment information of the reference nodes in the positioning system.

Figure 4:
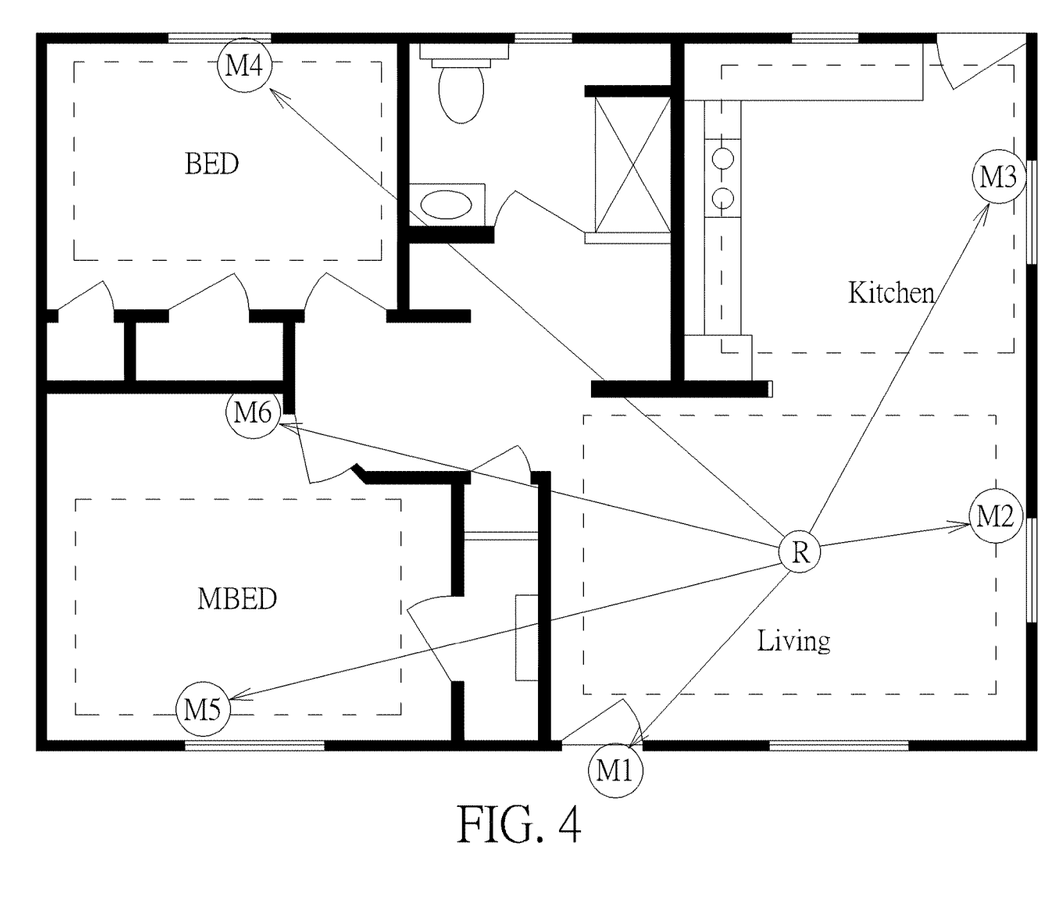
FIG. 4 is a schematic diagram of a room fingerprint establishment operation according to one embodiment of the present disclosure.

Please refer to FIG. 4, which illustrates a room fingerprint establishment operation. The mobile node R moves randomly within the Living room to cover every place of the room and collects raw RSSI data from every reference nodes M1-M6. After the mobile node R collects RSSI data from each of the reference nodes M1-M6 in every place of the room, the mobile node R performs statistical analysis on the raw RSSI data to get average values and standard deviation values corresponding to the reference nodes M1-M6 respectively. That is, for each of the reference nodes M1-M6, the mobile node R obtains an average value and a stand deviation value according to the raw RSSI data collected from each of the reference nodes M1-M6. In addition, the mobile node R uses the standard deviation value to filter out the RSSI data outside a range, which is represented by the equation of Mean+−C*Sigma, wherein "Mean" is represented as the average value, "C" is a constant and is determined by experiment and experience, and "Sigma" is represented as the standard deviation value. This step is used to filter out the un-reasonable RSSI data, which is caused by RF fading effect, RF reflection, moving object interference, and so on.

After filtering those un-reasonable RSSI data, the mobile node R uses the remaining RSSI data to re-calculate new average values and uses the new average values to obtain distances between the mobile node R and reference nodes M1-M6. The distances between the mobile node R and reference nodes M1-M6 are calculated by the following equation: Distance=(RSSI Data−RSSI Mean)^2, wherein "RSSI Data" is represented as the remaining RSSI data and "RSSI Mean" is represented as the re-calculated new average value.

After the mobile node R obtains distances with each of the reference nodes M1-M6, the mobile node R finds the maximum distance with each of reference nodes M1-M6. As a result, for each reference node, the mobile node R obtains an average value and a maximum distance. Therefore, there are 6 sets of Mx(RSSI Mean, Max Distance), wherein "Mx" is represented as reference nodes M1-M6 "Max Distance" is represented as the maximum distance.

It is noted that, the "RSSI Mean" could be treated as a RSSI value at the center of a room (i.e. the Living room), and the "Max Distance" would be treated as the radius of the room. In a word, in order to define a room, the room fingerprint established in the mobile node includes two parameters, namely "RSSI Mean" and "Max Distance".

After the room fingerprint is completely established (i.e. the mobile node R performs the abovementioned room fingerprint establishment operation for all rooms such as "BED", "Kitchen "MBED" of FIG. 1), the mobile node R can perform real-time position determination. The mobile node R captures RSSI data from each of the reference nodes M1-M6 periodically at run-time. Since real-time RSSI data is varied by distance between the reference node and the mobile node R, the real-time RSSI data should change smoothly without jumping out. Thus, for positioning accuracy, the mobile node R performs a real-time RSSI data filtering operation, which removes un-reasonable real-time RSSI data without statistic calculation time delay.

Figure 5:
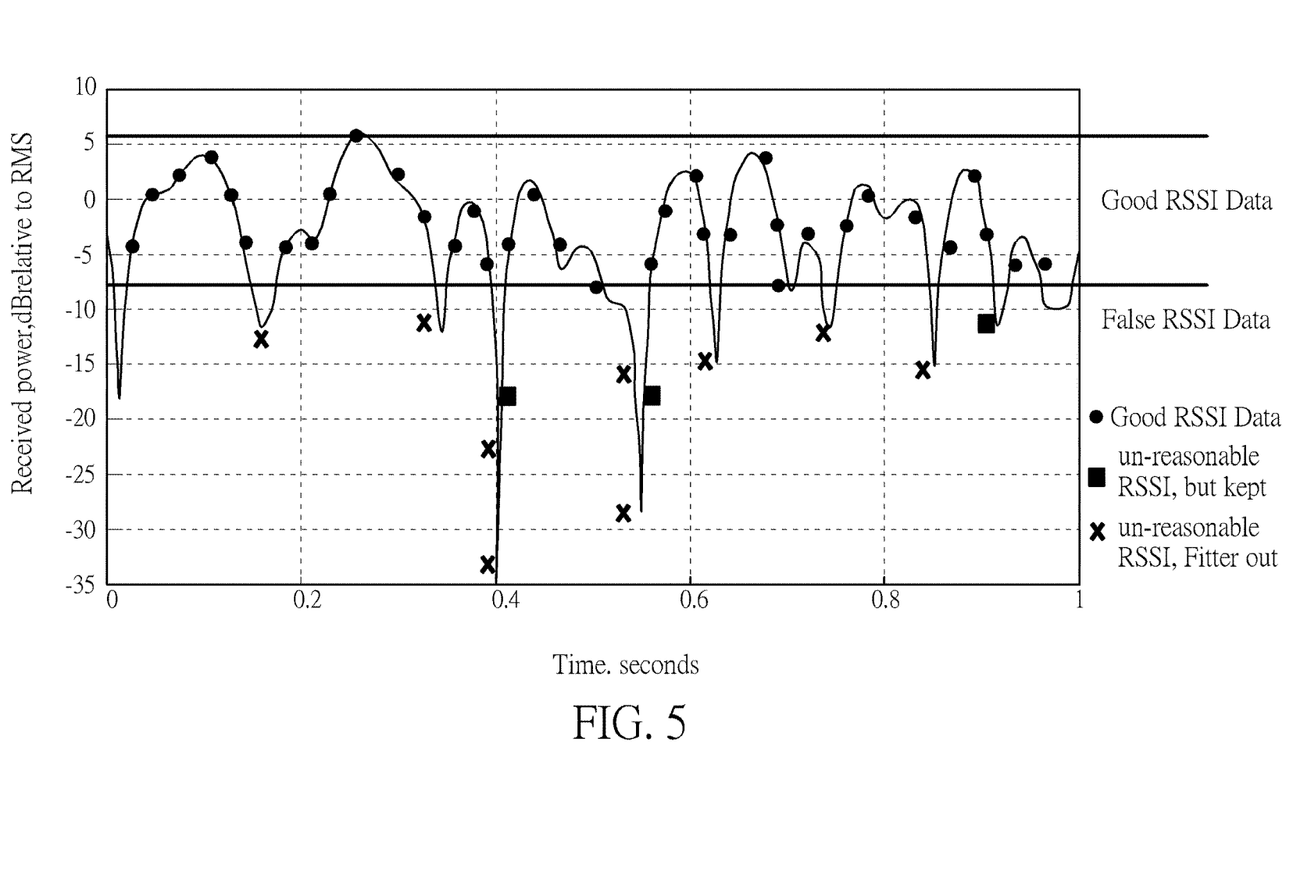
FIG. 5 is a schematic diagram of a real-time RSSI filtering operation according to one embodiment of the present disclosure.

In detail, please refer to FIG. 5, which illustrates a real-time RSSI filtering operation. As shown in FIG. 5, if the adjacent measured real-time RSSI data changes hugely, it must be caused by other effect, for example, interference of other object or fading caused by reflection. In other words, the real-time RSSI data change not effected by the distance will cause huge RSSI value drop, such as by moving obstacle. Therefore, the mobile node shall filter out those real-time RSSI data having a huge value drop compared with the previous real-time RSSI data. It is noted that, the drop value for filtering the real-time RSSI data may be predetermined and set in the mobile node. In addition, those filtered-out RSSI data will not be used for position determination. On the other hand, the mobile node R uses the previous RSSI data and the next RSSI data for position determination, and ignores the filtered-out RSSI data for position determination at run-time. In this example, the mobile node R only filters out the real-time RSSI data which is value dropped, and does not filter out the real-time RSSI data which is value increased even it is below a predetermined threshold, marked as "False RSSI data" of FIG. 5.

Figure 6:
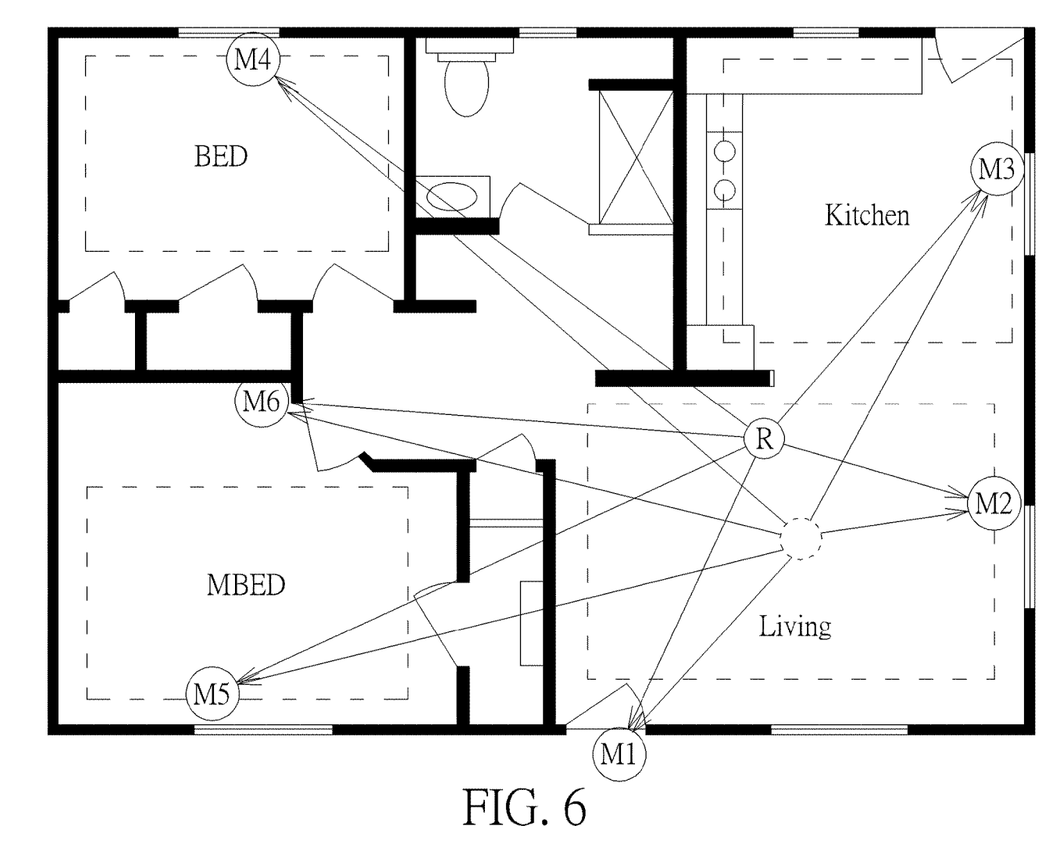
FIG. 6 is a schematic diagram of a room based position determination operation according to one embodiment of the present disclosure.

Please refer to FIG. 6, which illustrates a room based position determination operation. As abovementioned, the mobile node R performs a real-time RSSI data measurement and filters out huge value dropped RSSI data. The remaining real-time RSSI data are used for room based position determination. In detail, the mobile node R compares distance between the mobile node R and each of the reference nodes M1-M6 with each room's radius (represented as To_Mx distance) according to the following equation:

$$\text{To\_Mx distance} = (\text{radius of room}) - (\text{remaining real-time RSSI data} - \text{RSSI Mean})^2;$$

if the To_Mx distance >0: it means the mobile node R is inside the room;

if the To_Mx distance <0: it means the mobile node R is outside the room.

In a word, when the radius of the room is larger than the distance between the mobile node R and the reference node, the mobile node R is certainly inside the room. Otherwise, the mobile node R is outside the room.

Moreover, the mobile node R may sum the 6 results of To_Mx distance of each room with some weighting on each (depends on experiment and experience), and therefore gets 4 sum results corresponding to 4 rooms (i.e. "BED", "Kitchen", "MBED" and "Living"). The biggest positive value shows which room the mobile node R is at. However, if all 4 sum results are negative, it means the mobile node R is outside the 4 rooms, namely the mobile node R is in other room. In an embodiment, the negative value may be considered as a condition for determining which room the mobile node R is closed to. For example, the smaller of the sum result, the closer to the room.

In an embodiment, if the room position is not able to be determined (i.e. all rooms are get negative value, namely in other room), the mobile node R may perform a normalization process on the collected real-time RSSI data from each reference node, and then do the room based position determination operation. In other embodiments, if the measured real-time RSSI data are not at the same level as the time the room fingerprint established, the mobile node shall perform the normalization process on the collected real-time RSSI data.

Figure 7:
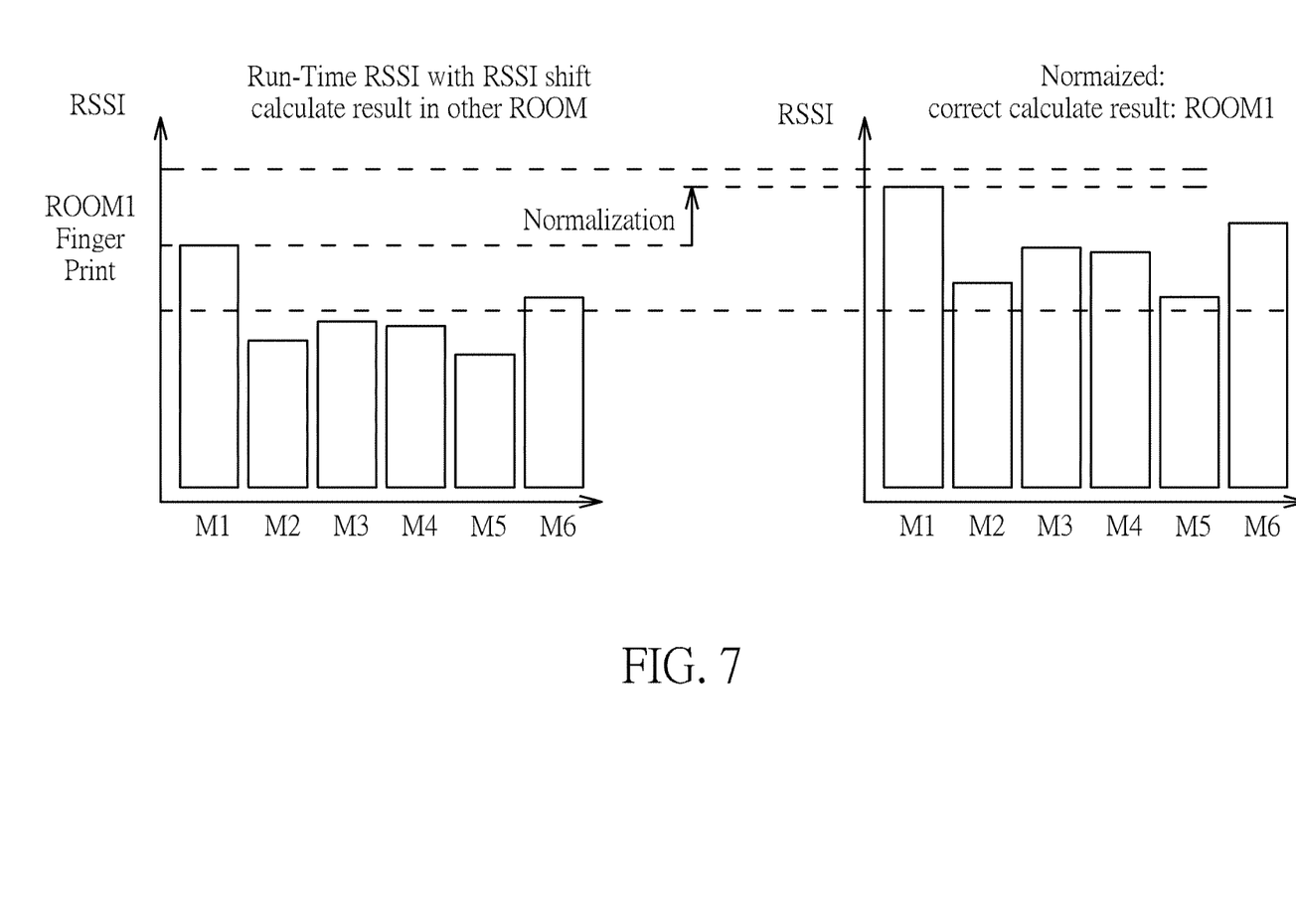
FIG. 7 is a schematic diagram of a normalization process according to one embodiment of the present disclosure.

Please refer to FIG. 7, which illustrates a normalization process. The mobile node R chooses a reasonable offset range, for example −30 dB to +10 dB, to search the best normalization level. As shown in FIG. 7, the real-time RSSI data is added with a first offset value within the offset range, and therefore the real-time RSSI data collected from each of the reference nodes M1-M6 are shifted to a higher level. Then, the mobile node R uses the normalized real-time RSSI data for the abovementioned room base position determination. If the mobile node R finds a room it is at, it is a correct offset value. However, if the mobile node R cannot find a room it is at, the mobile node R chooses a second offset value within the offset range for real-time RSSI data normalization and performs the room base position determination. That is, if the mobile node R cannot find a room it is at, the mobile node R may determine it is in other room, and then uses other offset value for normalization. In other words, as long as the mobile node R is in a room, it should find an offset value which can make the calculation associated to the room based position determination to indicate it is inside the room. If it is not inside any room, there will be no offset value to make the calculation to indicate it is in any room.

Figure 8:
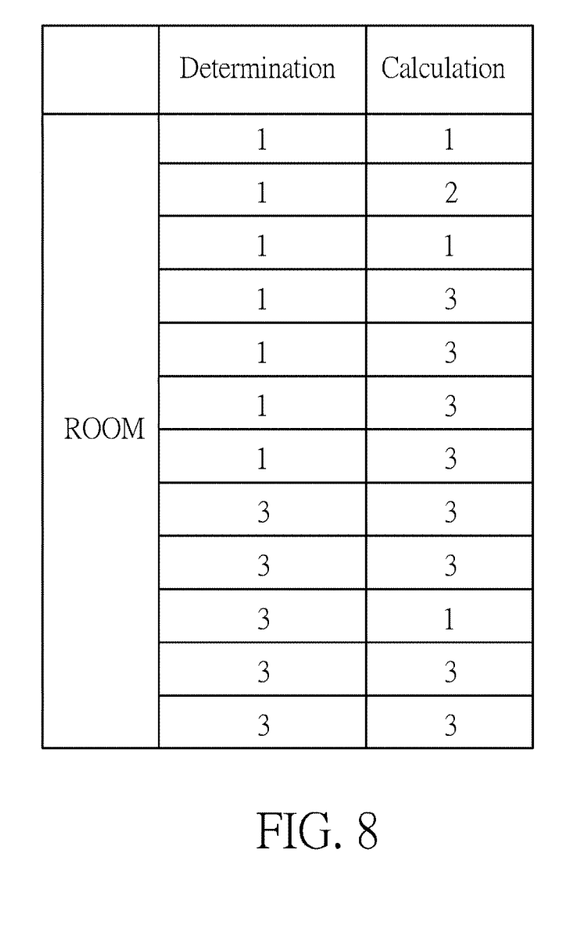
FIG. 8 is a schematic diagram of room based examining process according to one embodiment of the present disclosure.

There may be some wrong room determination, and thus the applicant proposes a method to filter it out by the real world situation. For example, it is impossible for a mobile node R to jump back and forth between different rooms. In other words, room determination result should be consistent in a period of time. For decreasing a ratio of false room determination result, the mobile node R performs a room based examining process. Reference is made to FIG. 8. The mobile node R determines that it is from the ROOM="1" to the ROOM="3" only if the mobile node obtains the same room calculation result (i.e. the mobile node obtains 5 times calculation result="3"). Otherwise, the mobile node R determines that the mobile node is in ROOM="1". For example, the mobile node R obtains 1 time calculation result="2", but the mobile node R does not determine it moves to ROOM="2". However, the mobile node R still considers it is at ROOM="1". Similarly, when the mobile node R determines that it is at ROOM="3", and obtains 1 time calculation result="1", the mobile node R does not determines it move to ROOM="1", but determines it is still at ROOM="3". In a word, only the same room calculation result in a row can be used for room determination, to enhance the room based position determination operation.

Figure 9:
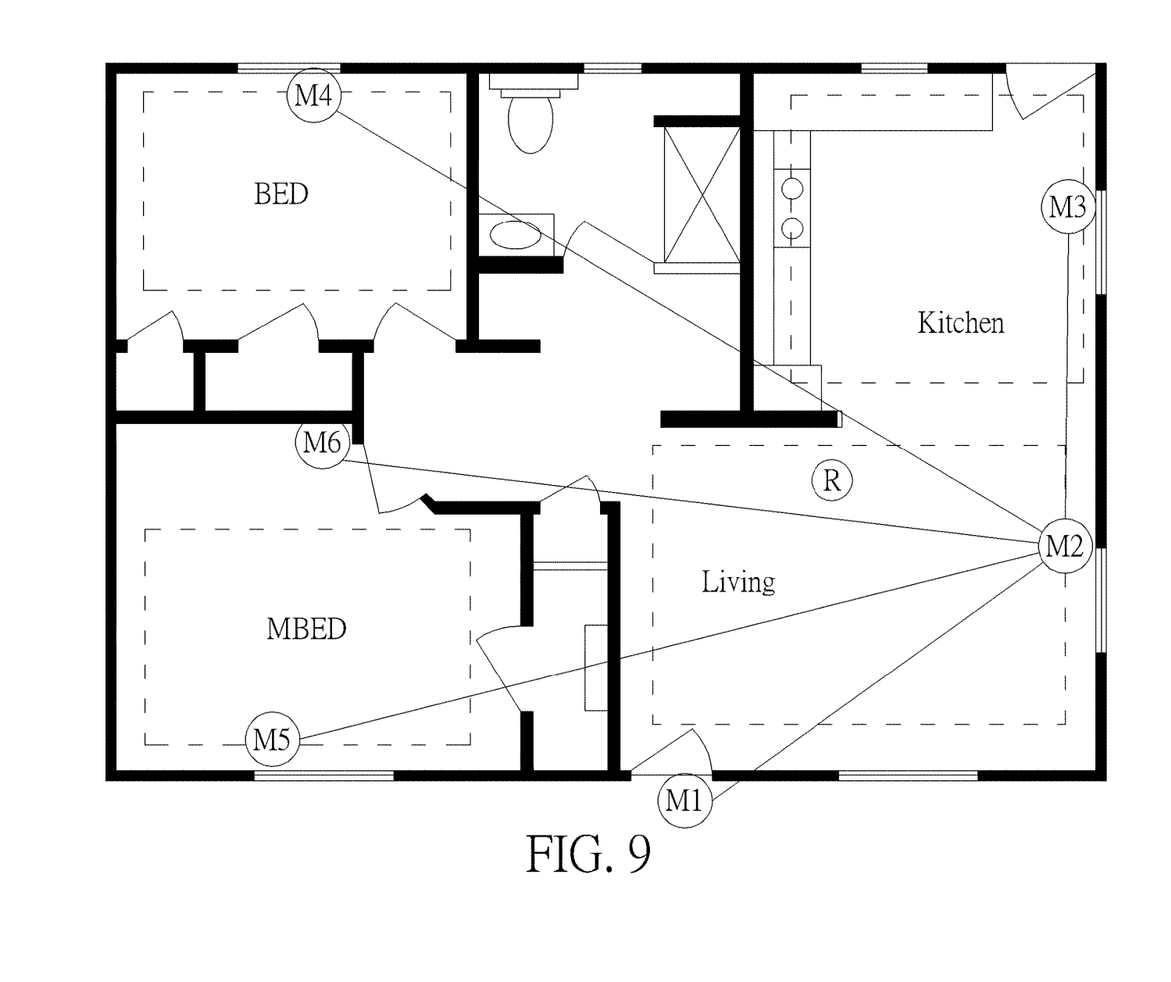
FIG. 9 is a schematic diagram of a position detection process according to one embodiment of the present disclosure.

For more precise position determination within the room, the applicant proposes a position detection process to estimate a position of the mobile node R inside the room. Reference is made to FIG. 9. The reference nodes M1-M6 periodically collect RSSI data from each other, which can be seen as a virtual RF fence line between any of two reference nodes. As shown in FIG. 9, the reference node M2 collects RSSI data from reference nodes M1 and M3-M6, and creates virtual RF fence lines M2-M1, M2-M3, M2-M4, M2-M5 and M2-M6. If there is RSSI data change, it means a mobile node R cross a RF fence line between the two reference nodes. Since the mobile node R has been determined within the room by previous RSSI calculation, with virtual RF fence line, the reference node knows the mobile node R is located at the RF fence line. For example, in FIG. 9, the mobile node R has been decided in Living room by previous calculation, by using reference node M2 as the origin point, the moving node R can be decided to be at the virtual fence line M2-M4 direction. In addition, with RSSI data received by the reference node from the mobile node R, the reference node M2 can calculate the exactly distance to the mobile node R by the "Free Space RF Power Loss" vs. distance equation, which shall be well known in the art. Since there is no obstacle in the room, the reference node M2 can determine a precise position within the room by the distance.

The abovementioned concept, such as room fingerprint and filtering operation can be also applied for the reference nodes M1-M6. In detail, the reference nodes M1-M6 each determines a room in an area deployed with a mobile node of the positioning system, and collects RSSI data from the mobile node R moving within the room. Thus, with these collected RSSI data, the reference nodes M1-M6 can establish the room fingerprint. In addition, the reference nodes M1-M6 can perform real-time position determination according to the room fingerprint. The detailed calculation and operation can be referred from above, so it is omitted herein.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention aims at room fingerprint establishment, so that the mobile node is able to determine which room it is at without knowing coordination or deployment information of reference nodes. In addition, the mobile node of the present invention estimates it's position after knowing which room the it is at, so the position estimation is more accuracy compared to the conventional position estimation method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of room based position determination for a mobile node in a positioning system, the method comprising:
   determining a room in an area deployed with at least a reference node of the positioning system;
   collecting a plurality of received signal strength indicator (RSSI) data from the at least a reference node in every place of the room;
   establishing a room fingerprint database, which includes a RSSI mean parameter indicating a RSSI value at the center of the room and a maximum distance parameter indicating a radius of the room, wherein the RSSI value and the radius are calculated according to the collected RSSI data from the at least a reference node;
   performing a real-time RSSI measurement on the at least a reference node, to collect a plurality of real-time RSSI data from the at least a reference node; and
   determining whether the mobile node is within the room according to the RSSI mean parameter, the maximum distance parameter of the room fingerprint database and the collected real-time RSSI data from the at least a reference node.

2. The method of claim 1, wherein establishing the room fingerprint database comprises:
   calculating a standard deviation value and an average value with the collected RSSI data from the at least reference node;
   filtering out a RSSI data of the plurality of RSSI data from the at least a reference node according to the average value and the standard deviation value; and
   calculating the RSSI value at the center of the room by averaging the remaining RSSI data from the at least a reference node, and the radius of the room with the RSSI value and the remaining RSSI data.

3. The method of claim 2, further comprising:
   filtering out a real-time RSSI data of the plurality of real-time RSSI data from the at least a reference node, which is dropped in a predetermined threshold in compared with the previously collected real-time RSSI data.

4. The method of claim 3, wherein determining whether the mobile node is within the room according to the RSSI mean parameter, the maximum distance parameter of the room fingerprint database and the collected real-time RSSI data from the at least a reference node comprises:
   calculating a distance between the mobile node and the at least a reference node with the remaining real-time RSSI data and the RSSI value;
   comparing the distance with the radius of the room;
   determining the mobile node is inside the room when the distance is smaller than the radius, to generate a room determination result; and
   determining the mobile node is outside the room when the distance is larger than the radius.

5. The method of claim 4, wherein determining the mobile node is inside the room when the distance is smaller than the radius comprises:
   determining the mobile device is inside the room when the distance is smaller than the radius and the room determination result is consistent in a period of time.

6. The method of claim 1, further comprising:
   filtering out a real-time RSSI data of the plurality of real-time RSSI data from the at least a reference node, which is dropped in a predetermined threshold in compared with the previously collected real-time RSSI data.

7. The method of claim 6, wherein determining whether the mobile node is within the room according to the RSSI mean parameter, the maximum distance parameter of the room fingerprint database and the collected real-time RSSI data from the at least a reference node comprises:
   determining whether the mobile node is within the room according to the RSSI mean parameter, the maximum distance parameter of the room fingerprint database and the remaining real-time RSSI data; and
   determining whether the mobile node is within the room according to the RSSI mean parameter, the maximum distance parameter of the room fingerprint database and the previously collected real-time RSSI data.

8. The method of claim 1, further comprising:
   performing a normalization process on the collected real-time RSSI data to scale the collected real-time RSSI data with a predetermined offset range.

9. The method of claim 8, wherein determining whether the mobile node is within the room according to the RSSI mean parameter, the maximum distance parameter of the room fingerprint database and the collected real-time RSSI data from the at least a reference node comprises:
   determining whether the mobile node is within the room according to the RSSI mean parameter, the maximum distance parameter of the room fingerprint database and the scaled real-time RSSI data.

10. A method of room based position determination for a first reference node in a positioning system, the method comprising:
    determining a room in an area deployed with a mobile node of the positioning system;
    collecting a plurality of received signal strength indicator (RSSI) data from the mobile node moving within the room;

establishing a room fingerprint database, which includes a RSSI mean parameter indicating a RSSI value at the center of the room and a maximum distance parameter indicating a radius of the room, wherein the RSSI value and the radius are calculated according to the collected RSSI data from the mobile node;

performing a real-time RSSI measurement on the mobile node, to collect a plurality of real-time RSSI data from the mobile node; and determining whether the mobile node is within the room according to the RSSI mean parameter, the maximum distance parameter of the room fingerprint database and the collected real-time RSSI data.

11. The method of claim 10, wherein establishing the room fingerprint database comprises:

calculating a standard deviation value and an average value with the collected RSSI data from the mobile node;

filtering out a RSSI data of the plurality of RSSI data from the mobile node according to the average value and the standard deviation value; and calculating the RSSI value at the center of the room by averaging the remaining RSSI data, and the radius of the room with the RSSI value and the remaining RSSI data.

12. The method of claim 11, further comprising:

filtering out a real-time RSSI data of the plurality of real-time RSSI data from the mobile node, which is dropped in a predetermined threshold in compared with the previously collected real-time RSSI data.

13. The method of claim 12, wherein determining whether the mobile node is within the room according to the RSSI mean parameter, the maximum distance parameter of the room fingerprint database and the collected real-time RSSI data from the mobile node comprises:

calculating a distance between the mobile node and the first reference node with the remaining real-time RSSI data and the RSSI value;

comparing the distance with the radius of the room;

determining the mobile node is inside the room when the distance is smaller than the radius, to generate a room determination result; and determining the mobile node is outside the room when the distance is larger than the radius.

14. The method of claim 13, wherein determining the mobile node is inside the room when the distance is smaller than the radius comprises:

determining the mobile device is inside the room when the distance is smaller than the radius and the room determination result is consistent in a period of time.

15. The method of claim 10, further comprising:

filtering out a real-time RSSI data of the plurality of real-time RSSI data from the mobile node, which is dropped in a predetermined threshold in compared with the previously collected real-time RSSI data.

16. The method of claim 15, wherein determining whether the mobile node is within the room according to the RSSI mean parameter, the maximum distance parameter of the room fingerprint database and the collected real-time RSSI data from the mobile node comprises:

determining whether the mobile node is within the room according to the RSSI mean parameter, the maximum distance parameter of the room fingerprint database and the remaining real-time RSSI data; and determining whether the mobile node is within the room according to the RSSI mean parameter, the maximum distance parameter of the room fingerprint database and the previously collected real-time RSSI data.

17. The method of claim 10, further comprising:

performing a normalization process on the collected real-time RSSI data to scale the collected real-time RSSI data with a predetermined offset range.

18. The method of claim 13, further comprising:

periodically collecting a RSSI data from a second reference node of the positioning system; and determining the mobile node is positioning between the first reference node and the second reference node when determining the mobile node is within the room and detecting a RSSI change between the currently collected RSSI data from the second reference node and the previously collected RSSI data from the second reference node.

19. The method of claim 18, further comprising:

when determining the mobile node is positioning between the first reference node and the second reference node, determining a precise position of the mobile node within the room according to the a distance calculated by a power loss over distance equation to the mobile node.

* * * * *